March 8, 1966  N. BLOEMBERGEN  3,239,670
MICROWAVE MODULATION OF OPTICAL RADIATION IN A WAVEGUIDE
Filed Nov. 17, 1961  2 Sheets-Sheet 1
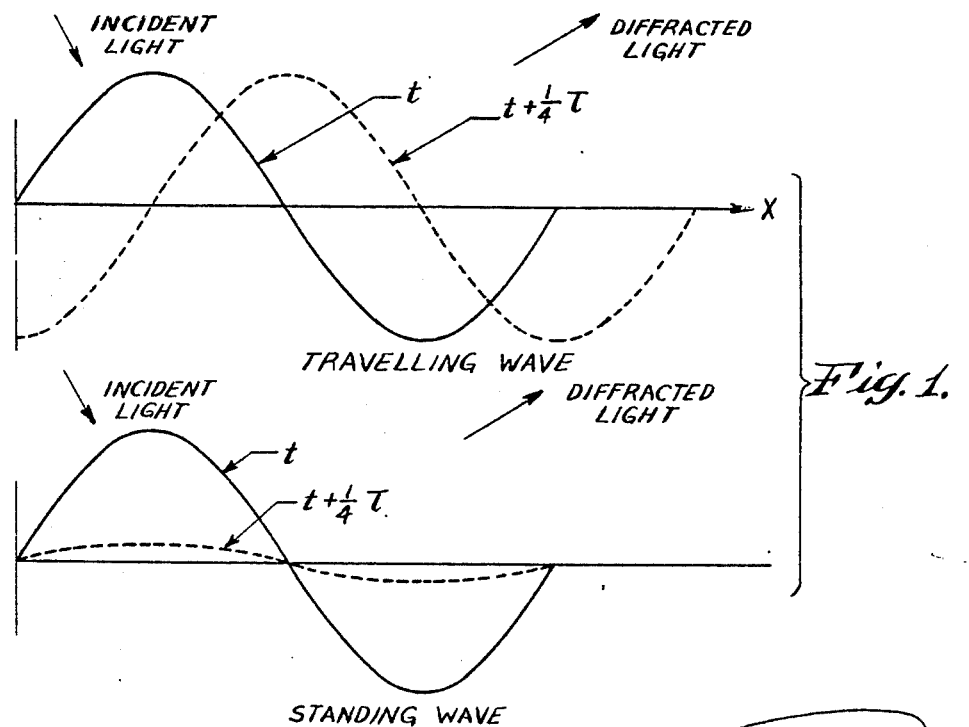
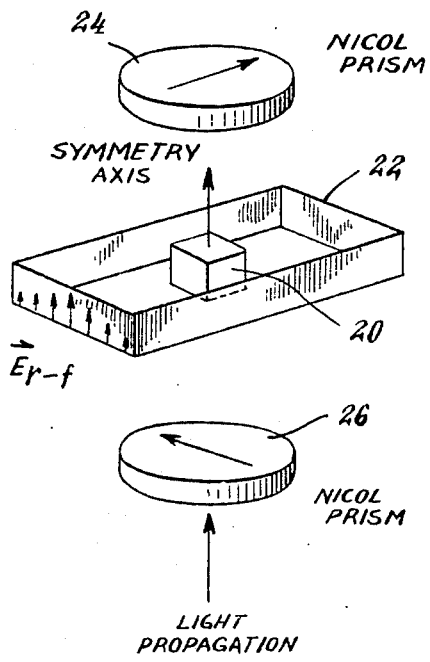
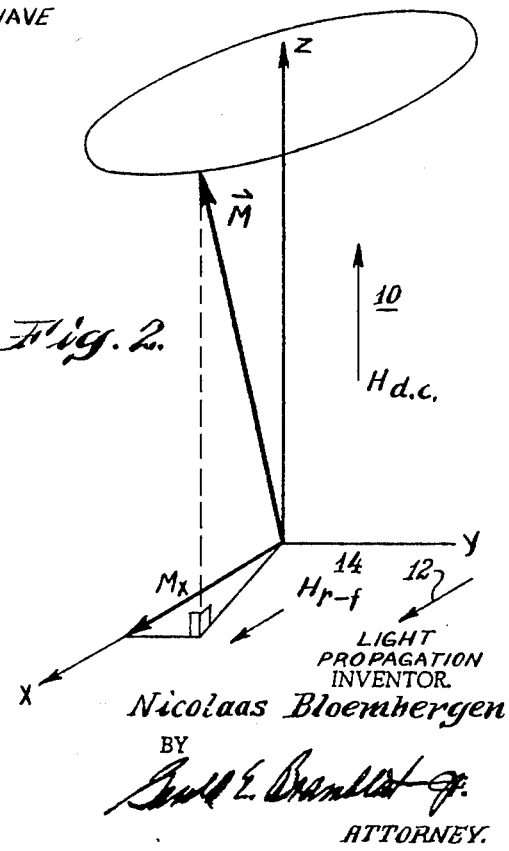
INVENTOR.
Nicolaas Bloembergen
BY
ATTORNEY.

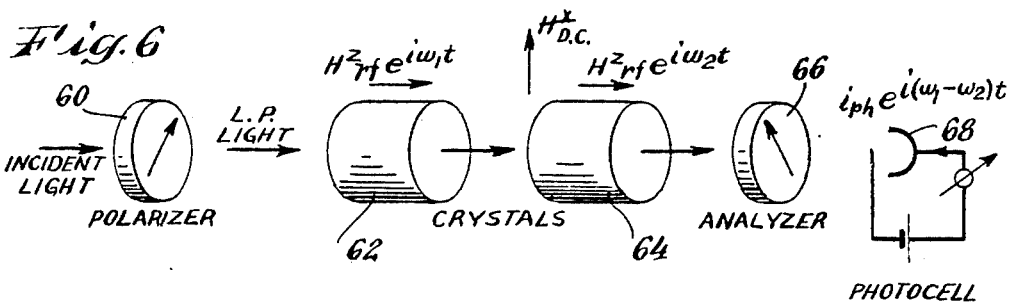
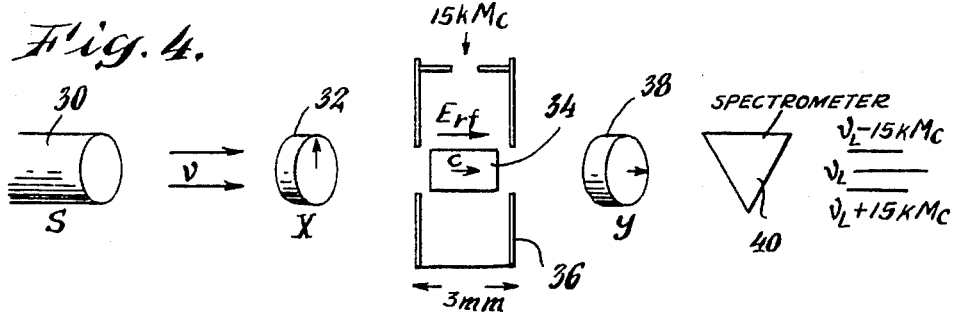
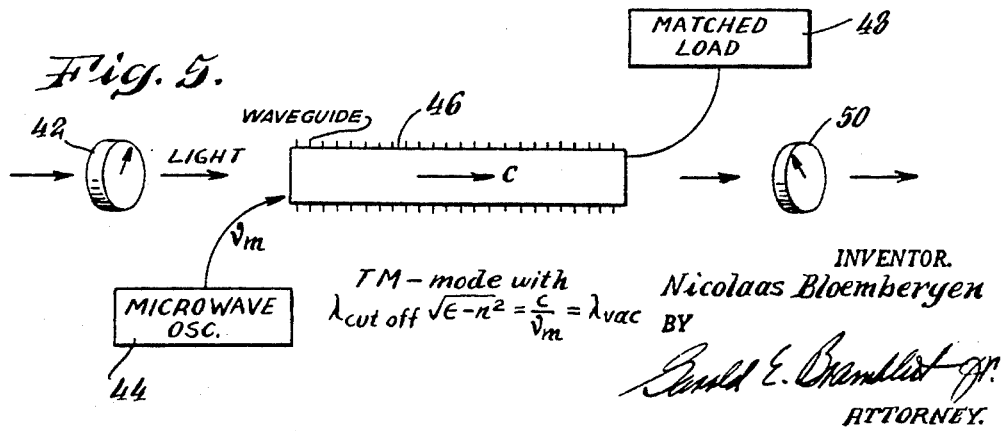

United States Patent Office
3,239,670
Patented Mar. 8, 1966

3,239,670
MICROWAVE MODULATION OF OPTICAL
RADIATION IN A WAVEGUIDE
Nicolaas Bloembergen, Stonewall Road,
Lexington, Mass.
Filed Nov. 17, 1961, Ser. No. 153,054
2 Claims. (Cl. 250—199)

This invention relates to radiation modulation and, more particularly, to the modulation of light at microwave frequencies.

I. Introduction

The history of light modulation goes as far back as 1881 when Righi (2, J. Phys. 437 (1883)) modulated light by periodically rotating one of a pair of crossed Nicols. The primary object of this invention is to extend the frequency at which light can be modulated up to, and beyond, the microwave range.

Other objects, features, and advantages will be apparent from the following description, appended claims, and the figures of the attached drawings wherein:

FIG. 1 illustrates a traveling and a standing wave;
FIG. 2 illustrates a method for obtaining a modulation effect;
FIG. 3 illustrates apparatus for accomplishing one type of light modulation;
FIG. 4 illustrates a variation of the apparatus of FIG. 3;
FIG. 5 illustrates still another apparatus according to the invention; and
FIG. 6 illustrates apparatus for detection of light modulation.

For a driving force in this frequency range we have at our disposal the electromagnetic radiation from standard microwave tubes as well as the microwave ultrasonics that they, in turn, can generate. Modulation schemes are thus conveniently separated into electric, magnetic and acoustic methods.

For practical modulation one should use these effects in solids. Gases are not dense enough to have sufficient interaction with the microwave-optical fields. Polar liquids which have suitable Kerr constants have high losses at these frequencies, and since one needs very large powers to get effects, there is a serious heating problem. For example, nitrobenzene exhibits a loss tangent of 3/5 at 3 kmc./sec. and 25° C. Carbon disulphide is a non-polar liquid that has a large Kerr constant. Because it is nonpolar its dielectric losses are lower than nitrobenzene. It is, however, very volatile and difficult to handle. Carbon disulphide has been used to make a Kerr cell at 3 kmc./sec. with the shutter opened to 30% transmission for 17 kw. pulses. The duty cycle was one in ten thousand and the repetition rate was 120 pulses per second. Heating effects, even with the lower losses, would never allow for C.W. operation.

II. Acoustic effects

Acoustic effects that have been usefu in solids at lower frequencies, (compare, for example, Browne at 84 kc./sec. (40, Proc. Phys. Soc. Lond. 36 (1928)) and R. A. Houston at 115 mc./sec. (142, Nature (1938)), run into difficulties as the frequency is raised. The speed of sound in a solid like fused quartz is of the order of $5 \times 10^5$ cm./sec. At 2 kmc./sec. the acoustic wavelength is 25,000 angstroms, or approximately 5 optical wavelengths. Branskii (2, Soviet Physics-Doklady 237 (1958)) and Bommel and Dransfield (1, Phys. Rev. Letters 234 (1958)) were able to detect a travelling wave in quartz by observing diffraction of light from the periodic variations in the index of refraction caused by the elasto-optic effect and a 2 kmc./sec. acoustic wave. The diffraction pattern, however, was not modulated at 2 kmc. FIG. 1 illustrates the difference between a travelling wave and a standing wave, both shown at two different times which are ¼ period apart. The travelling wave acts as a moving diffraction grating and produces a constant diffraction pattern. The standing wave, however, modulates the diffraction grating, and thus the diffraction pattern, at twice the wave frequency.

To modulate light there has to be a definite time-space relationship between the diffraction pattern produced by the acoustic wave and the light to be diffracted. For example, if one could match the velocity of a travelling acoustic wave with the velocity of light in the same crystal the optic and acoustic frequencies would beat and modulate the light. This is done in the standing wave because the velocity of the acoustic standing wave is zero. For light perpendicular to the flat face of a thin crystal the component of the velocity of the light in the plane of the crystal is also zero.

The velocity of light is $10^5$ times larger than the velocity of sound. One would need to define a light beam to better than one second of arc in order to match one component of the velocity of light to the velocity of a travelling acoustic wave. Even then it is necessary to preserve the collimation of the light beam as it goes through the piezoelectric crystal. On the other hand, it is not technically feasible to make an acoustic resonator in which one can set up a well defined standing wave at microwave frequencies.

The above considerations aside, the upper frequency limit for acoustic modulation is of the order of 10 kmc./sec. The acoustic wavelength at this frequency is of the order of 5000 A., which is the same as an optical wavelength. The wavelength of higher frequencies would be too small for a useful grating. Acoustic techniques do not promise to provide practical light modulation at microwave frequencies.

III. Magnetic effects

Magnetic modulation of light is considerably more promising. Between the various magneto-optic effects, i.e. the Voigt effect, Cotton-Mouton effect, magnetic Kerr effect, and Faraday effect, the Faraday effect is by far the strongest. We will consider only modulation by the Faraday effect.

If we place a transparent paramagnetic sample between two crossed Nicols, and if there is no magnetic field, no light will pass through the assembly. If we apply a sinusoidally varying magnetic field parallel to the light, the light's plane of polarization will rotate by an angle $\theta$ given by, $$\theta = AdH \sin(\omega t) \qquad (1)$$

where:

$A$ = Verdet's constant
$d$ = the crystal thickness
$H$ = the amplitude of the magnetic field, The intensity of light coming through the analyzer is $$I = I_0 \sin^2 \theta \qquad (2)$$

For small H this becomes $$I \approx I_0 [AdH]^2 (1 - \cos 2\omega t)/2 \qquad (3)$$

Van Vleck and Hebb (46, Phys. Rev. 17 (1934)) showed that in rare earth paramagnetic crystals the Faraday rotation is proportional to the component of magnetization along the direction of light propagation. Equation 3 is thus valid for all frequencies at which the magnetization can follow the applied fields.

If there is a large D.C. biasing field the spins are unable to follow at frequencies larger than $1/T_1$, the spin lattice relaxation rate. Since one needs low temperatures to get a large Faraday effect, $1/T_1$ is of the order of kilocycles. Without the biasing field the spins can follow at frequencies higher than $1/T_1$ but not larger than $1/T_{21}$ the cross relaxation rate in zero field. For a concentrated paramagnetic crystal $1/T_{21} \approx 1/T_2 = \Delta \omega$, the line width, can be several kmc./sec. In the last equation, $T_2$ is the spin dephasing time. The complex magnetic susceptibility $\chi' + i\chi''$, however, goes as $(1+i\omega T_{21})^{-1}$. Even through $\chi'$ is still very large, $\chi''$ is also significant and the spin system heats up. This is especially troublesome at low temperatures where $T_1$ is also along and the spins cannot give the energy to the lattice.

We can get a component of magnetization varying at microwave frequencies by the scheme illustrated in FIG. 2. A D.C. field 10 applied perpendicular to the direction of light propagation 12 causes the paramagnetic ions to have a resonant frequency $g\beta H_{D.C.}/h$, where $g$ is the Lande $g$-factor. An R.-F. field 14 perpendicular to the D.C. field and near enough to the resonant frequency will cause the magnetization to swing out and precess. Based on considerations of Redfield (98, Phys. Rev. 1787 (1955)) it is possible to have a large dispersive component of the R.-F. susceptibility even though the absorptive part is well saturated. One can show that for $\omega = g\beta H_{D.C.}/h \pm \sqrt{(\Delta \omega)^2}$ and for an isotropic $g$-factor, $$|M_x| = \frac{1}{4} \frac{H_{R.-F.}}{\Delta H} M_{D.C.} \qquad (4)$$

where $\Delta H$ is the half width of the absorption line in Gauss and $M_{D.C.}$ is the D.C. magnetization in the absence of an R.-F. field.

It can be shown in general that the angle of rotation of the plane of polarization is proportional to the magnetization. If we define $\phi$ as the rotation per unit length of crystal and $\phi_{sat}$ as the rotation at absolute zero, i.e. the rotary power saturates the same as the magnetization, $$\phi = \phi_{sat} M_x / M_{sat} \qquad (5)$$

This relation holds equally well for time varying and D.C. magnetization. From Equations 4 and 5, $$\phi = \frac{\phi_{sat}}{4} \frac{H_{R.-F.}}{\Delta H} \cdot \frac{M_{D.C.}}{M_{sat}} = \frac{\phi_{sat}}{4} \frac{H_{R.-F.}}{\Delta H} \cdot \frac{S+1}{3} \frac{g\beta H_{D.C.}}{kT} \qquad (6)$$

A typical example of a crystal with a large Faraday effect and suitable resonance properties is neodymium ethylsulphate. For reasons that will become apparent we will actually consider a dilute magnetic crystal, 3% Nd, 97% La ethylsulfate. The light propagates down the $x$-axis, which is the symmetry axis of this uniaxial crystal, the D.C. field is applied in the $z$-direction, and the R.-F. field is in the $x$-direction. Correcting for the anisotropic $g$-factor and considering only the even isotopes of Nd since they have no hyperfine splitting, Equation 5 becomes $$\frac{\phi}{(\phi_{sat})_{||}} = \frac{1}{4}\left(\frac{g_{||}}{g_\perp}\right) \frac{H_{R.-F.}}{\Delta H} \cdot \frac{S+1}{3} \frac{g_\perp \beta H_{D.C.}}{kT} \eta \qquad (7)$$

where $\eta$ is the fraction of even isotopes, S is the total electron spin, and $$(\phi_{sat})_{||}$$

is the saturation value of the rotation along the symmetry axis. For $\Delta H = 7.5$ Gauss, $S = \frac{7}{2}$, $\eta = 0.8 \frac{g_{||}\beta H_{D.C.}}{h} = 15$ kmc. per/sec.
$T = 4°K$, $H_{R.-F.} = 1$ gauss, $g_{||} = 3.53$, $g_\perp = 2.07$, and $\phi_{sat}$ (3% Nd)$_{||} = .03$ $\phi_{sat}$ (100% Nd)$_{||} = 3.42°/$mm.

one calculates $\phi = .014°/$mm. For a 5 mm. crystal we get a rotation of 4.21 minutes of arc. This rotation is low and would be difficult to detect, however, there are several possible ways to increase the effect. First, we can lower the temperature. $T = 1°$ K. would increase the rotation for a 5 mm. crystal to 17 minutes of arc. It would not help to increase the neodymium concentration since the increase in $\Delta H$ would almost completely offset the increase in $\phi_{sat}$. The more concentrated crystal has a larger magnetization but it can't be tipped over as far as the more dilute one. The increased line width also means more power is needed to saturate the absorption and this causes a heating problem in the cryostat. Another way to get a large transverse magnetization is by applying a 90° pulse. This would give a transverse magnetization as large as the D.C. magnetization, a gain of almost an order of magnitude over the C.W., resonance method.

The most promising improvement for any application of the Faraday effect would be to use light near an optical absorption frequency. The Verdet constant contains terms like $$(\nu^2 - \nu_{ij}^2 + 2\pi i\nu \Gamma_{ij})^{-1}$$

where $\nu_{ij}$ is an optical absorption frequency.

The largest drawback to the use of resonance techniques is that the band width of the modulator is small. It is either that part of the line width due to the spin-spin interactions or $1/T_1$, whichever is larger. On the basis of heating considerations, however, we want a narrow line and this means a dilute crystal with very small spin-spin interaction. A practical compromise would leave the band width not larger than several megacycles per second.

There would be considerable advantage to using the same effects in ferromagnetic materials at room temperature. Dillon (29, J. Appl. Phys. 539 (1958)) and Bloembergen et al. (120, Phys. Rev. 2014 (1960)) have discussed this possibility. Non-linear coupling effects to other spin wave modes make it impossible to build up a large transverse magnetization with resonance radiation. Large optical absorption coefficients make it necessary to use extremely thin samples. The maximum theoretical effects in YIG (yttrium-iron garnet), for example, are not larger than in the best paramagnetic crystals and the possibilities for enhancement available in the paramagnetic case are not present.

IV. *Electric effects*

The electro-optic effect in solids, where it often is the applied field, can be much greater than in liquids, where it always goes as the field squared. The reason for this is that in liquids the molecules are free to rotate, so one has to average over all orientations of the molecule and the linear terms drop out. In a solid, on the other hand, the molecules are held in fixed positions and, if there is no inversion symmetry, the linear terms do not average out. Crystals like potassium dihydrogen phosphate (KDP) and ammonium dihydrogen phosphate (ADP) have already been used by Carpenter to modulate light but only up to one megacycle per second.

One can get a linear electro-optic effect in liquids by applying a D.C. bias field. This serves the same purpose in a liquid as the internal crystalline field in a solid, i.e., it destroys the parity of the ground state. Consider the incremental change in the birefringence as a function of field. For the biased liquid it is $\sigma(n_1 - n_2) = 2\lambda BE_0 \sigma E$ where $\lambda$ is the free space wavelength, $B$ is the Kerr constant (for $CS_2$) $B = 3.21 \times 10^{-7}$ ([cm./(stat volt)$^2$]) and $E_0$ is the bias field. For KDP at microwave frequencies $\sigma(n_1 - n_2) = 7.8 \times 10^{-7} \sigma E$ where $\sigma E$ is in stat volts/cm.

At 5000 A. and $E = 7,500$ kilovolts/cm. $\sigma(n_1 - n_2)$ in $CS_2$ and KDP are equal. With the largest possible bias field the electro-optic effect in $CS_2$ is less, by an order of magnitude, than in KDP.

In considering crystals for use at microwave frequencies one must take care to distinguish between birefringence due to a photo-elastic effect caused by the piezo-electric deformation of the crystal and the direct electro-optic effect. At low frequencies both effects are present but at frequencies higher than the mechanical resonance of the crystal the lattice is unable to follow the rapid fluctuations in the electric field and one has just the electro-optic, or linear Kerr, effect. The linear Kerr effect in the dihydrogen phosphates is only limited by how fast the hydrogen atoms can follow the vibrating electric field. Judging by the dielectric loss data of Von Hipple (Dielectric Materials and Applications, (Technology Press of MIT, Cambridge, Mass., 1954)) they can still follow at 15 kmc./sec. This is further confirmed by Newman (18, Jour. Chem. Phys. 669 (1950)) who determined a correlation time for the hydrogen motion from nuclear magnetic resonance measurements. At 250° K. the rate corresponding to this time was of the order of 0.5 kmc./sec. for KDP: however, it is very temperature dependent and at 300° K., it is probably of the order of 5 kmc./sec. ADP is an order of magnitude faster. Preliminary measurements indicate a loss tangent of .01 to .005 in KDP at room temperature, this corresponds to a Q of from 100 to 200.

Another crystal that has a large linear Kerr effect is ZnS. Electro-optic measurements on ZnS, to date, have been made with clear sections of natural crystals.

To modulate light we put the crystal 20 in a microwave cavity 22 as shown in FIG. 3. The crystal axis, the direction of light propagation, and the microwave electric field are all parallel. This is put in between two crossed Nicol prisms 24, 26. Without the electric field the crystal becomes birefringent, the difference in the indices of refraction is $n_1-n_2=n_0^3 r_{ij}E$, where E is the electric field, $n_0$ is the index of refraction when $E=O$, and $r_{ij}$ is the electro-optic constant. For a crystal $d$ cm. long the ratio of the minor to major axis of the eliptically polarized light coming out of the crystal is $$\frac{E_{\min.}}{E_{\max.}} \approx \theta \times \frac{\pi d n_0^3 r_{ij} E}{\lambda_0} \qquad (8)$$

for $\theta \ll 1$, and $\lambda_0$ is the free space wavelength of the light. For perfect Nicols the average intensity of the modulated light is $\frac{1}{2}\theta^2 I_0$, where $I_0$ is the intensity of the incident light. To have practical modulation this must be at least comparable to the light leak through the system.

For KDP there is a leak because the crystal is not isotropic; for finite intensity one needs a finite solid angle and light not exactly parallel to the axis gets depolarized and contributes to the light leak. In practice, however, this leak can be made smaller than the depolarization due to other causes. Dislocations, for example, cause the major axis of the crystal to vary by a fraction of a degree so that even perfectly parallel light gets slightly depolarized. For a KDP crystal, .070" thick, between two crossed Nicols the relative transmission is 1/4000 for perfectly parallel light. In terms of an equivalent angle, $\theta_{(\text{leak})}=2\sqrt{(1,4000)} \approx 1°$.

Table I lists the electro-optic constants of several crystals with large Kerr constants. Carbon disulfide is also listed for comparison with a liquid Kerr cell. ZnS and CuCl are cubic crystals with large enough constants to make excellent solid state Kerr cells. NaClO₃ is cubic but its constant is rather low.

TABLE I.—ELECTRO-OPTIC CONSTANTS FOR VARIOUS MATERIALS

| Crystal | Symmetry Class | Electro-Optic Coefficient ($10^{-10}$ cm./volt) | | Index of Refraction |
|---|---|---|---|---|
| | | Constant Stress (low frequency) | Constant Strain (high frequency) | |
| CuCl | $T_d$ | $r_{41}=6.1$ | | 1.93 |
| ZnS | $T_d$ | $r_{41}=1.6$ to 2.1 | $r'_{41}=2$ | 2.36 |
| NaClO₃ | T | $r_{41}=.4$ | $r'_{41}=.032$ | 1.513 |
| KH₂PO₄ (KDP) | $V_d$ | $r_{63}=-11, r_{41}=8.6$ | $r'_{63}=-7$ | $n_{\parallel}=1.51, n_{\perp}=1.47$ |
| NH₄H₂PO₄ (ADP) | $V_d$ | $r_{63}=-8.3, r_{41}=21$ | $r'_{63}=-4.8$ | $n_{\parallel}=1.52, n_{\perp}=1.48$ |
| CS₂ | Liquid | $B=.36 \times 10^{-11}$ cm./(volt)² | | |

From Table I for KDP $r'_{63}=0.6\times10^{-9}$ cm./volt, $n_0 \approx 1.5$ so for $\lambda=5000$ A. one needs $E=770$ volts/cm. for $\theta_{(\text{effect})}=1°$. A microwave cavity 0.1" x 0.1" x 0.07" filled with KDP, $\epsilon' \cong 20$, $\epsilon'' \cong 0.2$, (where $\epsilon'$ and $\epsilon''$ are the real and imaginary parts of the complex electric susceptibility) at 15 kmc./sec. will develop this E field for 330 milliwatts. This is just about the maximum power such a small crystal can dissipate without being destroyed by thermal effects. On a pulse basis, for example a 20 watt pulse, the induced ellipticity can be increased to $E_{\min}/E_{\max}=\sin \theta \approx \sin 8°$, the intensity of the modulated light is .01 $I_0$.

Another apparatus utilizing KH₂PO₄ is illustrated in FIG. 4, wherein a suitable monochromatic light source 30 illuminates a first Nicol prism 32. The polarized radiation passes through the KDP crystal 34 which is positioned in a microwave cavity 36. Radiation from crystal 34 then passes through a second Nicol prism 38 and into a spectrometer 40. Modulation has been achieved in this device using a cavity 3 mm. long and a microwave frequency of 15 kmc.

Still another apparatus utilizing the electro-optic Kerr effect is the traveling wave type modulator shown in FIG. 5. In this device, light from the first Nicol prism 42 passes, with the modulating microwave from an oscillator 44, through a waveguide 46 filled with the crystal. The dimension of the guide is such as to support a traveling wave of the desired frequency. The microwave energy then goes to a load 48 and the modulated light passes through the second Nicol prism 50.

In the absence of an applied field the cubic crystals are all isotropic and this gives them two great advantages. First they can be used with a much larger aperture. Secondly, with uniaxial crystals one has to use thin samples because the light leak goes up with increasing sample thickness. In a thick, isotropic, cubic crystal, however, one can build a travelling wave modulator by making the phase velocity of microwaves in a wave guide equal to the speed of light in the crystal.

V. Detection

A suitable detection apparatus is illustrated in FIG. 6. The illustrated device is for demodulation by the Faraday technique but those skilled in the art will note its applicability to the Kerr electro-optic effect. Incident light passes through polarizer 60, becoming linearly polarized. The polarized light then passes through a heterodyning system of crystals 62, 64 and then through an analyzer 66. From analyzer 66, the light impinges upon a photocell 68. The photocurrent is modulated at an intermediate beat frequency.

As used herein, the term "light" refers not only to visible radiation but also to electromagnetic radiation in general.

It will be apparent to those skilled in the art that this invention is a basic improvement having many possible uses in widely divergent fields such as communications and basic research into the structure of matter. Many variations and modifications may be made in this invention without departing from the spirit and scope thereof. This invention is to be construed as limited only by the scope of the following claims.

I claim:

1. Apparatus for modulating light at microwave frequencies comprising a light source, light polarizing means positioned to be illuminated by said source, a mass of solid crystalline material exhibiting an elecro-optic effect positioned to be traversed by light from said source polarized by said polarizing means, a wave guide disposed about said mass, means to irradiate said mass with microwave energy propagated through said mass substantially parallel to the passage of said polarized light therethrough, and analyzer means disposed in the path of said polarized light upon emergence from said mass, said guide imposing upon said energy a phase velocity substantially equal to that of said light within said mass.

2. Apparatus for modulating light at microwave frequencies comprising a light source, light polarizing means positioned to be illuminated by said source, a mass of solid crystalline material exhibiting the linear Kerr electro-optical effect positioned to be traversed by light from said source polarized by said polarizing means, a wave guide surrounding said mass, means to irradiate said mass with microwave energy propagated through said mass substantially parallel to the passage of said polarized light therethrough, and analyzer means disposed in the path of said polarized light upon emergence from said mass, said wave guide imposing upon said energy within said wave guide a phase velocity substantially equal to that of said light within said mass.

References Cited by the Examiner

UNITED STATES PATENTS

| | | | |
|---|---|---|---|
| 1,565,566 | 12/1925 | Hartley | 88—61 |
| 1,792,752 | 2/1931 | Michelssen | 88—61 |
| 2,451,732 | 10/1948 | Herschberger | 88—61 |
| 2,493,200 | 1/1950 | Land | 88—61 |
| 2,531,951 | 11/1950 | Shamos et al. | 250—199 |
| 2,788,710 | 4/1957 | West | 250—199 |
| 2,811,898 | 11/1957 | West | 88—61 |
| 2,974,568 | 3/1961 | Dillon | 88—61 |
| 3,027,806 | 4/1962 | Koelsch et al. | 250—199 |

FOREIGN PATENTS

| | | |
|---|---|---|
| 342,219 | 1/1931 | Great Britain. |

OTHER REFERENCES

Carpenter: J. Opt. Soc. Amer., vol. 40, 1950, pp. 225–229.

Terman: Electronic and Radio Engineering, McGraw-Hill, 1955, pp. 678–681.

Aiello: "Model 1 Electro-Optic Light Modulator System," Los Alamos Scientific Lab., LA–2275, March 3, 1959, pp. 1–14.

Vogel et al.: Electronics, vol. 34, pp. 81–85, Nov. 10, 1961.

DAVID G. REDINBAUGH, *Primary Examiner.*

STEPHEN W. CAPELLI, *Examiner.*